United States Patent [19]
Hitchcock et al.

[11] Patent Number: 5,132,889
[45] Date of Patent: Jul. 21, 1992

[54] RESONANT-TRANSITION DC-TO-DC CONVERTER

[75] Inventors: Leonard J. Hitchcock, Montrose, Pa.; Michael M. Walters, Endwell; Ronnie A. Wunderlich, Endicott, both of N.Y.

[73] Assignee: IBM Corporation, Armonk, N.Y.

[21] Appl. No.: 700,739

[22] Filed: May 15, 1991

[51] Int. Cl.⁵ .......................................... H02M 3/335
[52] U.S. Cl. ..................................... 363/17; 363/91; 363/132
[58] Field of Search ...................... 363/17, 91, 98, 132

[56] References Cited

U.S. PATENT DOCUMENTS

| | | | |
|---|---|---|---|
| 3,076,131 | 1/1963 | Weil | 363/91 |
| 3,217,239 | 11/1965 | Lunney | 363/91 |
| 3,422,341 | 1/1969 | Kurimura et al. | 363/91 |
| 4,217,632 | 8/1980 | Bardos et al. | 363/26 |
| 4,356,438 | 10/1982 | Iwasaki | 363/91 |
| 4,447,866 | 5/1984 | Reeves | 363/21 |
| 4,462,069 | 7/1984 | Becky | 363/23 |
| 4,583,156 | 4/1986 | Forge | 363/17 |
| 4,591,966 | 5/1986 | Smith | 363/91 |
| 4,628,426 | 12/1986 | Steigerwald | 363/17 |
| 4,661,897 | 4/1987 | Pitel | 363/17 |
| 4,677,534 | 6/1987 | Okochi | 363/97 |
| 4,802,078 | 1/1989 | Hill | 363/56 |
| 4,811,187 | 3/1989 | Nakajima et al. | 363/25 |
| 4,814,962 | 3/1989 | Magalhaes et al. | 363/16 |
| 4,860,184 | 8/1989 | Tabisz et al. | 363/17 |
| 4,860,189 | 8/1989 | Hitchcock | 363/132 |
| 4,876,635 | 10/1989 | Park et al. | 363/17 |

FOREIGN PATENT DOCUMENTS

| | | |
|---|---|---|
| 61-221573 | 10/1986 | Japan . |
| 61-247271 | 11/1986 | Japan . |
| 61-258668 | 11/1986 | Japan . |
| 61-295869 | 12/1986 | Japan . |
| 61-295870 | 12/1986 | Japan . |
| 62-053175 | 3/1987 | Japan . |

OTHER PUBLICATIONS

Pepper, "The Orthogonal Field Magnetic Amplifier and Other Applications of Small-Core Saturable Magnetics to Switch-Mode Converters," *Proceedings of Powercon* 11, section A-3, 9 pages, Dec. 1984.

*Primary Examiner*—J. L. Sterrett
*Attorney, Agent, or Firm*—Sterne, Kessler, Goldstein & Fox

[57] ABSTRACT

The present invention is a circuit and method for reducing switching losses in a full bridge, resonant transition, switching power converter. The converter circuit includes a bridge switching circuit having an FET switch in each leg of the bridge. Each FET has a parasitic drain-to-source capacitance. The primary of a power transformer is connected across the bridge. Two secondary windings of the transformer are connected in a center-tapped configuration. A saturable reactor and a rectifier is connected in series with each secondary winding. A control means controls the conduction interval of the FET switches to produce a first and a second half-cycle of converter operation, each half-cycle including an on-time and a free-wheeling interval. The saturable reactors force unequal current distribution in the secondary windings during the free-wheeling intervals such that a primary current is caused to flow. This primary current is used to charge the parasitic capacitances of the FET switches such that each FET is switched ON only when its drain-to-source voltage is near zero.

16 Claims, 7 Drawing Sheets

RESONANT-TRANSITION DC-TO-DC CONVERTER

DESCRIPTION

1. Technical Field

This invention relates generally to the art of switching power converters. More specifically, the invention is a full bridge DC-to-DC converter which achieves reduced switching losses through the use of saturable cores to improve zero voltage switching.

1. Background Art

The power converter portion of modern electronic equipment tends to be bulky and is often the limiting factor when attempting to miniaturize. In reducing power converter size, designers have turned to increased switching frequencies. Higher frequencies allow for smaller, lighter inductive and capacitive energy storage devices, but also bring with them increased switching power losses.

Switching losses include the power that is dissipated in the transistor switch during turn-on and turn-off. The power dissipation results from the finite switching time of the transistor which allows the simultaneous presence of both voltage and current waveforms in the transistor. This problem is further exacerbated because inductive elements (which cause currents to flow even after the semiconductor switch is blocking high voltage) are used extensively in the power conversion circuits. Excessive switching power losses can result in damage to the switch and/or poor converter efficiency. Further, as the switching frequency increases, so do the switching losses.

The field effect transistor (FET) is the switch of choice at high frequencies. The FET provides faster switching times and lower conduction power losses than the conventional bipolar junction transistor (BJT).

Power converters use various methods and techniques to prevent the simultaneous presence of high voltage and high current on the switching devices. One class of converters uses zero-current switching to realize reduced switching losses. Unfortunately, this technique fails where it is most needed. The parasitic capacitance of the FET switches tend to store energy. During each cycle, this energy is dissipated in the switch during turn-on. At high frequencies, this dissipated energy can result in significant power losses.

Another class of converters, known as resonant converters, reduce switching losses through zero-voltage switching (ZVS). The resonant converter uses capacitor/inductor pairs at their resonant frequency to exclude the simultaneous presence of high voltage and high current at the switch during a transition. These converters, however, are limited to applications which can tolerate a variable switching frequency, and often the savings in reduced switching losses are offset by increases in conduction interval power losses.

Zero-voltage switching can also be accomplished in fixed frequency power converters. This technique uses resonant methods to shape the switch's voltage waveform in a converter that operates at a fixed switching frequency. Converters using this technique provide output regulation with pulse width modulation (PWM) control and are called zero-voltage resonant-transition converters. These converters reduce turn-on switching losses by turning each switch ON only when the voltage across it is near zero. While this technique has promised practical results, known topologies are able to provide zero voltage switching only over a limited range of load currents.

U.S. Pat. No. 4,860,189 to Hitchcock discloses one such resonant-transition converter which uses a ZVS technique. This patent discloses a novel ZVS switching scheme which uses energy stored in the leakage inductance and the magnetizing inductance of the primary of the main transformer during the primary on-time to charge the parasitic capacitors of the FET switches during the freewheeling interval More specifically, during the free-wheeling interval (i.e., the portion of each cycle when no energy is being supplied to the main transformer from the input power source, and current flowing in the output rectifiers is supplied by the output inductor), energy that was stored in the primary of the main transformer (during the primary on-time) is transferred to the parasitic drain-to-source capacitors of FET switches which will be turned ON during the next converter half-cycle. This allows the capacitors to charge such that the terminal of the FET (drain or source) which is not tied directly to the line voltage will be pulled up to near the line voltage. So that the net voltage appearing drain-to-source on each FET is near zero before it is turned ON.

While this is an effective switching scheme, the converter circuit disclosed in the '189 patent cannot maintain ZVS over a full load range. At light load conditions, the current present in the primary may be insufficient to charge all parasitic FET capacitances.

The present invention is an improvement of the '189 patent and is directed to overcoming the deficiencies of other known devices by providing a power converter which achieves reduced turn-on switching losses through zero voltage switching over the entire load range of the converter.

DISCLOSURE OF INVENTION

The present invention is a circuit and method for reducing switching losses in a full bridge, resonant transition, switching power converter. Switching losses are reduced through zero voltage switching. The converter circuit includes a bridge switching circuit having an FET switch (Q1–Q4) in each leg of the bridge. Each FET has a parasitic drain-to-source capacitance. The primary of a power transformer is connected across one diagonal of the bridge. First and a second secondary windings of the transformer are connected in a center-tapped configuration. A first saturable reactor and a first rectifier are connected in series with the first secondary winding. A second saturable reactor and a second rectifier are connected in series with the second secondary winding.

A control means determines the conduction interval of the FET switches to produce a first and a second half-cycle of converter operation, each half-cycle including an on-time and a free-wheeling interval. The saturable reactors force unequal current distribution in the secondary windings during the free-wheeling intervals such that a primary current is caused to flow. This primary current is used to charge the parasitic capacitances of the FET switches such that each FET is switched ON only when its drain-to-source voltage is near zero.

Operation of the converter is as follows. During the first half-cycle on-time, Q1 and Q4 conduct primary current. A secondary current flows in the first secondary winding causing the first saturable reactor to become saturated. Q4 is then switched OFF to commence the first half-cycle free-wheeling interval. During the free-wheeling interval, an output inductor sustains the secondary current. This current attempts to divide equally between the two secondary windings, however, the second saturable reactor is in a high impedance state such that current is substantially blocked from flowing through the second secondary winding. This secondary current causes the primary current to continue flowing by the transforming action of the transformer.

The induced primary current flows through Q1 and through the parasitic drain-to-source capacitances of Q3 and Q4. Q3 is turned ON when the voltage across it reaches a desired level (near zero). Q1 is then switched OFF, causing the primary current to flow through the parasitic drain-to-source capacitances of Q1 and Q2. Q2 is turned ON when the voltage across it reaches a desired level to commence the second half-cycle on-time.

During the second half-cycle on-time, Q2 and Q3 conduct primary current. A secondary current flows in the second secondary winding causing the second saturable reactor to become saturated. Q3 is then switched OFF to commence the second half-cycle free-wheeling interval. During the free-wheeling interval, the output inductor sustains the secondary current. This current attempts to divide equally between the two secondary windings, however, the first saturable reactor is in a high impedance state such that current is substantially blocked from flowing through the first secondary winding. This secondary current causes a primary current to continue flowing.

The induced primary current flows through Q2 and through the parasitic drain-to-source capacitances of Q3 and Q4. Q4 is turned ON when the voltage across it reaches a desired level (near zero). Q2 is then switched OFF, causing the primary current to flow through the parasitic drain-to-source capacitances of Q1 and Q2. Q1 is turned ON when the voltage across it reaches a desired level to recommence the first half-cycle on-time.

It is an advantage of the present invention that turn-on switching losses are reduced in a full bridge power converter through zero voltage switching.

It is a further advantage of the present invention that zero voltage switching is maintained over an extended converter load range.

It is a further advantage that reverse voltage damping is provided for the output Schottky rectifiers so that RC snubber networks are not necessary.

The foregoing and other objects, features and advantages of the invention will be apparent from the following more particular description of preferred embodiments of the invention, as illustrated in the accompanying drawings.

BEST MODE FOR CARRYING OUT THE INVENTION

It has been discovered by the inventors that the range of load current over which ZVS can be achieved is increased if only one-half of the center-tapped secondary winding of the power transformer is allowed to conduct current during the converter free-wheeling intervals. By limiting current flow to only one-half of the secondary winding, a reflected primary current (which is used to attain ZVS) can be maximized.

Figure 1:
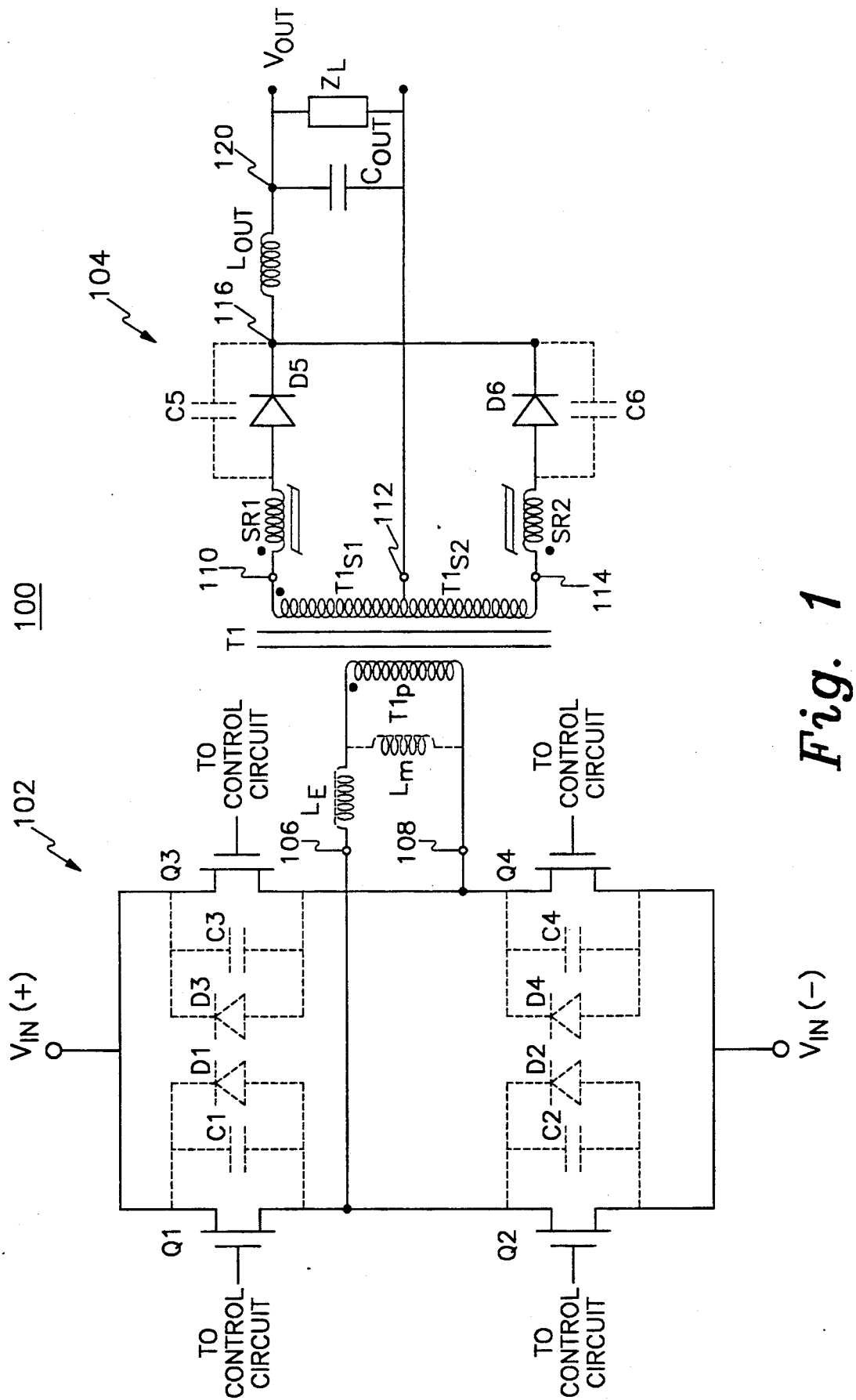
FIG. 1 is a schematic diagram of the converter circuit of the present invention.

Referring to the figures, the circuit and method of the preferred embodiments of the present invention are now described. With reference to FIG. 1, a full bridge, resonant transition, DC-to-DC switching power converter 100 is shown. Converter 100 includes a power switching circuit 102, a transformer T1, and a rectifier and output filter circuit 104.

As set forth below, power switching circuit 102 includes four transistor switches connected in a bridge configuration. A DC voltage (Vin) is applied across one diagonal of the bridge at inputs Vin(+) and Vin(−). The primary of T1 is connected across the other diagonal of the bridge. Power switching circuit 102 chops the DC voltage and provides the chopped voltage to transformer T1. T1 performs any necessary voltage transformation and provides isolation of the power switching circuit 102 from rectifier and output filter circuit 104.

Rectifier and output filter circuit 104 rectifies and smoothes the chopped voltage from transformer T1 to produce a DC output voltage which is supplied to a load $Z_L$. The DC output voltage is also fed back to a control circuit. The control circuit determines the conduction interval (i.e., on-time) for each of the transistor switches and controls the switching thereof. While the control circuit is not shown, a suitable circuit could be readily implemented by one skilled in the art.

The preferred control circuit uses a phase-shifted control regulator such as the UC1875 from Unitrode Corp., Lexington, Mass. Operation of the UC1875 control regulator is discussed in Mammamo, B. and Putsh, J., "Phase-Shifted PWM Control - A New Integrated Controller Eases the Design of Efficient High-Frequency Bridge Power Switching", IEEE 1991 APEC Conference Proceedings, CH2992-6/91/0000-0263.

It should be understood that any control circuit may be used provided that the proper sequencing of switching circuit 102 can be realized. As detailed below, switching circuit 102 must be able to clamp the voltage across $T1_P$ to zero and provide a path for primary current during each freewheeling interval One switching scheme which meets this criteria is disclosed in U.S. Pat. No. 4,860,189 to Hitchcock.

Power switching circuit 102 includes field effect transistors (FET's) Q1–Q4. As set forth above, Q1–Q4 are connected in a bridge configuration, with one FET in each leg of the bridge. The drain terminals of Q1 and Q3 are tied to Vin(+). The source terminals of transistors Q2 and Q4 are tied to Vin(−).

A parasitic capacitor C1 and a parasitic diode D1 are shown connected across the source and drain of transistor Q1. These devices are inherent features (parasitics) of transistor Q1 and are shown in phantom. Similarly, parasitic capacitors C2-C4 and parasitic diodes D2-D4 are shown connected across the source and drain of transistors Q2-Q4 respectively.

While the FET is the preferred switch for converter 100, it should be understood that a BJT could be used if an appropriate capacitor were connected collector-to-emitter to emulate the parasitic capacitance of the FET.

As set forth above, transformer T1 isolates power switching circuit 102 from rectifier and output filter circuit 104. T1 includes a primary winding $T1_P$ and a center-tapped secondary $T1_S$ having windings $T1_{S1}$ and $T1_{S2}$. Parasitic devices of $T1_P$ include a leakage inductance $L_E$ and a magnetizing inductance $L_M$.

$T1_P$ has a first terminal 106 and a second terminal 108. $T1_S$ has a first terminal 110, a second terminal 114, and a center-tapped terminal 112. The polarities of windings $T1_P$ and $T1_S$ are such that terminal 106 is the same polarity as terminal 110.

The source terminals of transistor Q1 and the drain terminal of transistor Q2 are tied to terminal 106 of $T1_P$. The source terminal of transistor Q3 and the drain terminal of transistor Q4 are tied to terminal 108 of $T1_P$.

Rectifier and output filter circuit 104 includes saturable reactors SR1 and SR2, rectifier diodes D5 and D6, an inductor $L_{OUT}$, and a capacitor $C_{OUT}$. D5 and D6 are Schottky diodes having parasitic capacitors C5 and C6 respectively. Saturable reactor SR1 is serially connected between terminal 110 of $T1_S$ and the anode of diode D5. Saturable reactor SR2 is serially connected between terminal 114 of $T1_S$ and the anode of diode D6. The cathodes of D5 and D6 are connected to a first terminal of inductor $L_{OUT}$. Capacitor $C_{OUT}$ is connected between a second terminal of inductor $L_{OUT}$ and center-tapped terminal 112 of $T1_S$. A load $Z_L$ is connected between the second terminal of $L_{OUT}$ and center-tapped terminal 112.

Converter Operation

Figure 2:
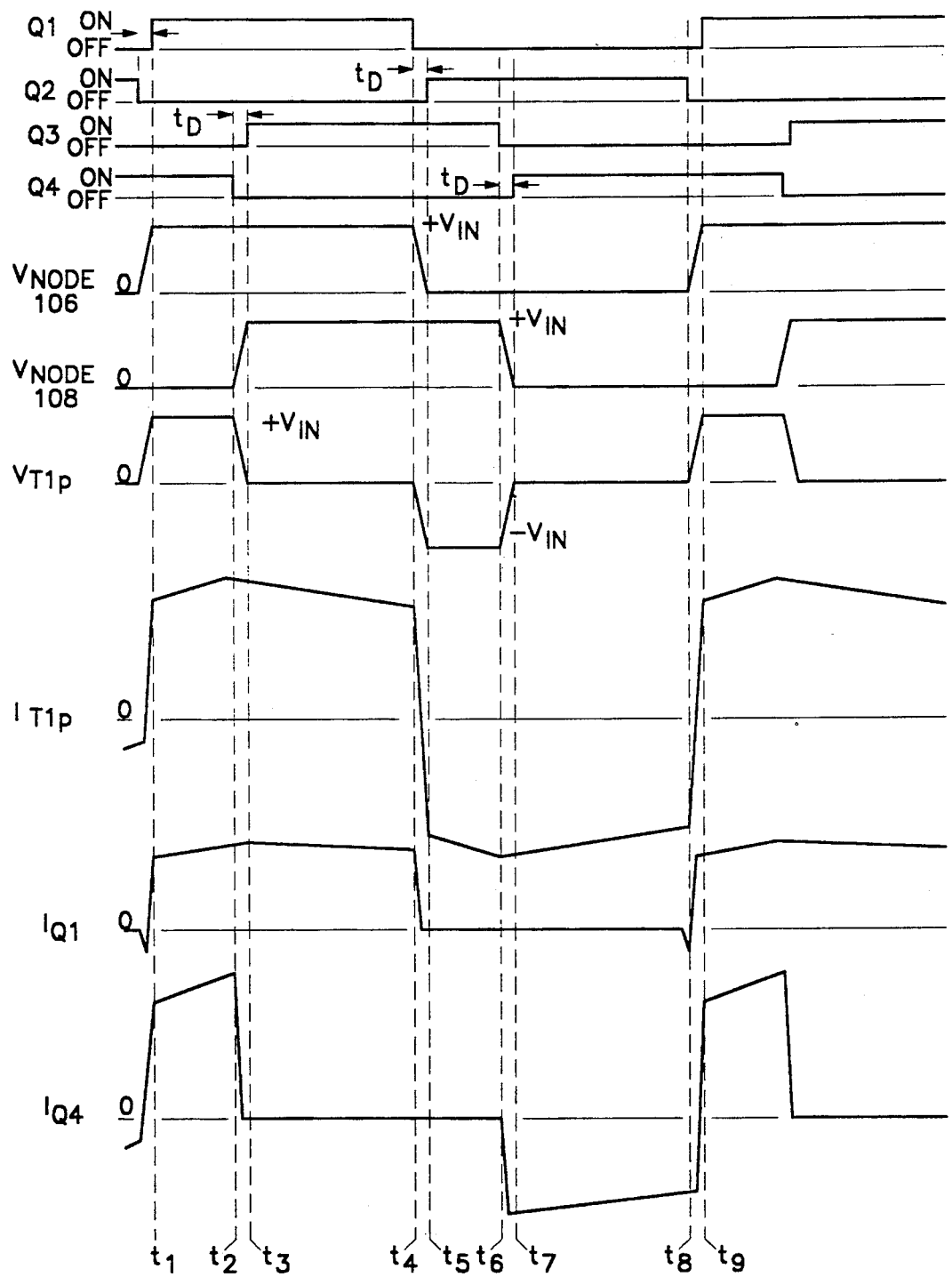
FIG. 2 is a timing diagram illustrating various voltage and current waveforms generated by the circuit of FIG. 1.

The operation of converter 100 is now described with reference to FIGS. 1 and 2. Switching control of transistors Q1-Q4 is performed via known methods as discussed above. A full converter switching cycle is discussed. The first half-cycle includes on-time ($t_1$ through $t_2$), off-time or free-wheeling interval ($t_3$ through $t_4$), and transition intervals ($t_2$ through $t_3$ and $t_4$ through $t_5$). The second half-cycle includes on-time ($t_5$ through $t_6$), off-time or free-wheeling interval ($t_7$ through $t_8$), and transition intervals ($t_6$ through $t_7$ and $t_8$ through $t_9$).

First Half-Cycle

At time $t_1$, Q4 is in the ON state from the previous cycle. Q1 is switched ON so that the supply voltage (Vin) is applied across $T1_P$ with node 106 being positive with respect to node 108. This will cause a current ($I_{T1P}$) to flow through $T1_P$. A corresponding current will be induced in $T1_{S1}$ which will flow through D5, through saturable reactor SR1 (causing it to saturate), through output inductor $L_{OUT}$, and finally to the load $Z_L$. No current will flow in $T1_{S2}$ because D6 is reverse biased.

At time $t_2$, Q4 is switched OFF. Current will continue to flow in $T1_P$ due to energy stored in $L_E$ and $L_M$, and by operation of rectifier and output filter circuit 104. Operation of circuit 104 is discussed in detail below. This induced primary current will flow through Q1 and $T1_P$ and into parasitic capacitors C3 and C4. As C3 and C4 are charged/discharged, the voltage across Q3 (C3) will decrease, and the voltage across Q4 (C4) will increase. Parasitic diode D3 will clamp node 108 at Vin(+) plus one diode drop. Transistor Q3 is switched ON at time $t_3$ with near zero voltage across its drain-to-source terminals.

During the freewheeling interval ($t_3$ to $t_4$), $I_{T1P}$ is circulated in transistors Q1 and Q3 and through primary winding $T1_P$. The transformer primary voltage, $V_{T1P}$ is clamped by transistors Q1 and Q3 to near zero. At time $t_4$, transistor Q1 is switched OFF. The current continues to flow through $T1_P$, and into parasitic capacitors C1 and C2. C1 is thus charged to Vin, and C2 is discharged such that node 106 is brought to the potential of Vin(−). Parasitic diode D2 clamps node 106 to a potential of Vin(−) less one diode drop. At time $t_5$, transistor Q2 is switched ON into near zero voltage and the second half-cycle of converter operation commences.

Second Half-cycle

The second half-cycle of operation is similar to the first half-cycle. When Q2 is switched ON, Vin is again applied across $T1_P$, however, node 108 is now positive with respect to node 106 This reversal in polarity from the first half-cycle will cause a negative current ($-I_{T1P}$) to flow through $T1_P$. A corresponding current will be induced in $T1_{S2}$ which will flow through D6, through saturable reactor SR2 (causing it to saturate), through output inductor $L_{out}$, and finally to the load $Z_L$. No current will flow in $T1_{S1}$ because D5 is reverse biased.

At time $t_6$, Q3 is switched OFF. Current will continue to flow in $T1_P$ due to energy stored in $L_E$ and $L_M$, and by operation of rectifier and output filter circuit 104. This current will flow through Q2 and $T1_P$ and through parasitic capacitors C3 and C4. As C3 and C4 are charged/discharged, the voltage across Q4 (C4) will decrease to zero, and the voltage across Q3 (C3) will increase. Parasitic diode D4 will clamp node 105 at Vin(−) less one diode drop. Transistor Q4 is switched ON at time $t_7$ with near zero voltage across its drain-to-source terminals.

During the freewheeling interval ($t_7$ to $t_8$), $-I_{T1P}$ is circulated in transistors Q2 and Q4, and through primary winding $T1_P$. Primary voltage $V_{T1P}$ is clamped by transistors Q2 and Q4 to near zero. At time $t_8$, transistor Q2 is switched OFF. The current continues to flow through $T1_P$ and through parasitic capacitors C1 and C2. C1 is thus discharged to zero while C2 is charged to Vin such that node 106 is brought to the potential of Vin(+). Parasitic diode D1 clamps node 106 to a potential of Vin(+) plus one diode drop. Q1 is now set-up for ZVS, and at time $t_9$, transistor Q1 is switched ON into near zero voltage, completing the second half-cycle and commencing the next cycle.

Rectifier and Output Filter Circuit 104

During the freewheeling intervals, this invention directs the current sourced by $L_{OUT}$ to flow through either half of $T1_S$ to produce a corresponding current $T1_P$. It is this reflected secondary current that provides the energy necessary to charge/discharge capacitors C1-C4 to achieve ZVS. If substantially equal currents were allowed to simultaneously flow in both $T1_{S1}$ and $T1_{S2}$, opposing (i.e., canceling) magnetic fluxes would be developed in the core of T1, and no substantial net current would be induced in $T1_P$. Thus, it is an important feature of the invention that one-half of the center-tapped secondary of T1 is forced to conduct a major portion of the load current during the free-wheeling interval.

Saturable reactors SR1 and SR2 provide the "blocking" required to force unequal current distribution in the secondary windings of T1 during the free-wheeling intervals. The term "blocking", as used herein, refers to the non-saturated, high impedance state of a saturable reactor. The core material of saturable reactors SR1 and SR2 is chosen to undergo a significant flux excursion during each converter half-cycle. This flux excursion allows the saturable reactor to provide a sufficiently large impedance to block a reapplied forward voltage for a specific blocking period (i.e., volt-time product). The volt-time product of the saturable reactor will be a voltage $V_X$ for a time $t_X$. The voltage $V_X$ is small because the secondary voltage is clamped by power switching circuit 102 during the freewheeling interval. The blocking interval $t_X$ may be any portion of or all of the freewheeling interval as governed by converter design requirements.

The amount of blocking (volt-seconds) provided by each saturable reactor is a function of how far the core is from saturation (i.e., operating point on the BH curve) at the beginning of the blocking mode. The process of bringing the core out of saturation and into its high impedance mode is known as "reset".

Either soft magnetic material (such as ferrite with round BH loop characteristics) or square loop magnetic material (such as hard metallic tape cores with square BH loop characteristics) can be used for the core of saturable reactors SR1 and SR2. The reset mechanism of the saturable core will differ depending on the material chosen, as is discussed in detail below.

Schottky Diode Snubbing

In addition to achieving ZVS, an additional advantage of the present invention is that the snubbers normally required to damp the high-frequency reverse voltage "ring" of the output rectifiers are eliminated. In Schottky rectifiers, the secondary leakage inductance resonates with the parasitic capacitance of the rectifier at turn-off. This results in a high-frequency current spike which causes noise problems and increases switching losses when reflected to the primary. This resonance is usually avoided by placing a shunt resistor across the diode with a large capacitor in series with the resistor to block DC. This RC snubber circuit adds complexity and power losses to the secondary circuit.

The present invention eliminates the need for output rectifier snubbers. SR1 and SR2 provide the damping necessary to avoid Schottky ringing. In one embodiment, for example, at time $t_4$ when Q1 turns OFF, the current in diode D5 is quickly reduced. This will drive SR1 out of saturation and into a high impedance state. The high impedance of SR1 will then limit the rate of rise of reverse voltage on the Schottky capacitances of D5 and prevent any ringing.

SR2 will perform a similar damping function for D6 at time $t_1$ when Q1 turns ON and the current through D6 goes to zero. The precise mechanism by which SR1 and SR2 provide diode damping is discussed in more detail below.

Saturable Reactors with Soft Magnetic Material

Figure 3:
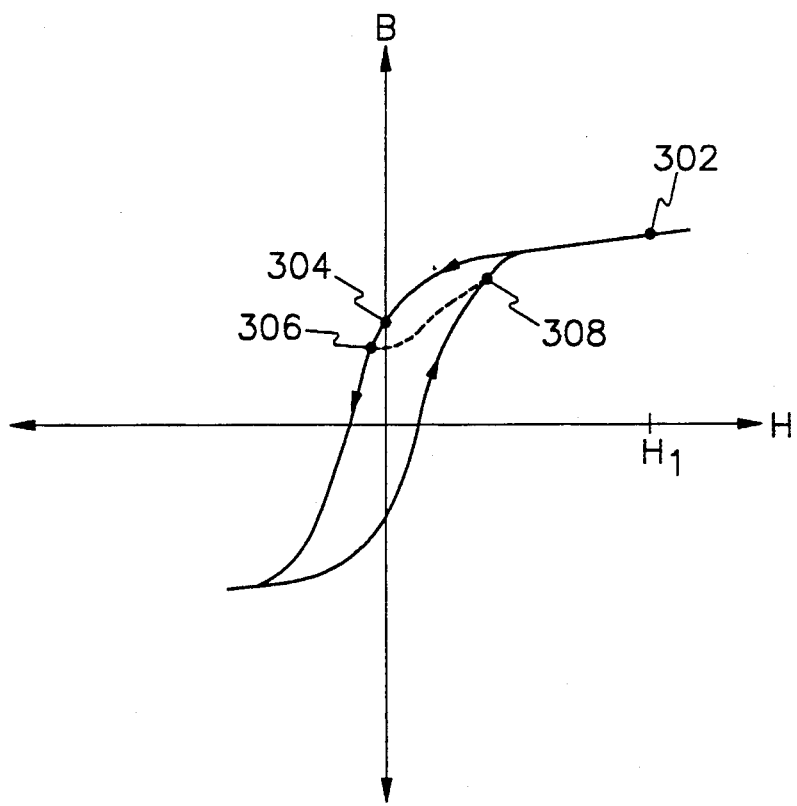
FIG. 3 shows a sample BH loop for a soft magnetic material.

A sample BH loop for a soft magnetic material is shown in FIG. 3. Point 302 indicates a state of core saturation at an operating magnetic field intensity of $H_1$. Point 304 indicates a point of significant impedance at zero magnetic field intensity (i.e., zero current). The round BH loop characteristic of the soft magnetic material dictates that as a current inducing a magnetic flux in the core is reduced to zero, the core will reset with a significant volt-time product (e.g., the operating point of the saturable reactor will travel from point 302 to point 304 on the BH curve). Thus, the soft magnetic material will reset as the current in the series connected diode approaches zero.

During operation of converter 100, the magnetic flux in the core will actually be reduced slightly below zero (e.g. to point 306) by a negative current which is required to reverse the voltage across the Schottky parasitic capacitance.

Reset will prevent significant conduction of current during the freewheeling interval. However, a small current will flow. This small current will cause the operating point of the saturable reactor to move from point 306 to point 308 (along the dash line) in FIG. 3 during the freewheeling interval.

The soft magnetic material will only provide blocking during the freewheeling interval. No significant blocking is provided at the turn-on transition. At the start of the turn-on transition, &he core of the saturable reactor which had previously been blocking will saturate (e.g., the operating point moves from point 308 to point 302). Thus, since no blocking is available, only the energy in leakage inductance $L_E$ of T1 will be available to charge/discharge capacitors C1 and C2. The energy in $L_E$ will charge/discharge C1 and C2 in a resonant manner such that the voltage transition for transistors Q1 and Q2 at the beginning of each half-cycle on-time will be of sinusoidal form. The voltage amplitude and frequency are functions of $I_{T1P}$, $L_E$, and the value of parasitic capacitors C1 and C2.

Saturable Reactors with Square Loop Material

Figure 4:
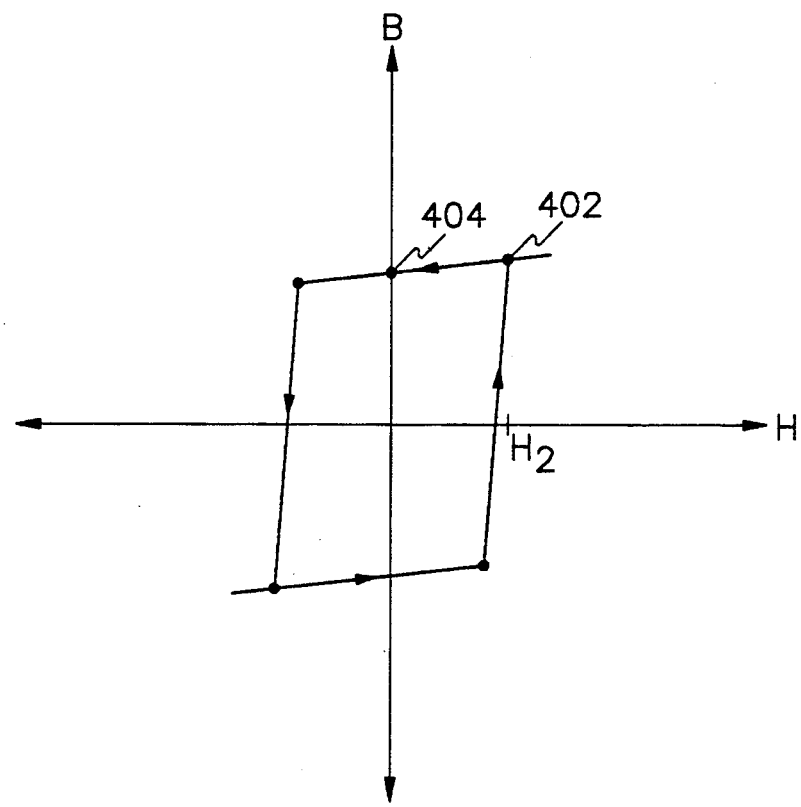
FIG. 4 shows a sample BH loop for a square loop magnetic material.

A sample BH loop for a square loop material is shown in FIG. 4. Point 402 indicates an operating point of core saturation at a magnetic field intensity $H_2$. Point 404 indicates a point at zero magnetic field intensity (i.e., zero current). Note that the core is still saturated at point 404. Thus, the square loop material will not be reset until a significant reverse current flows which will bring the core out of saturation. This current is known as a reset current.

In some applications, the reverse recovery current (i.e., charge stored in parasitic capacitors C5 and C6) of the Schottky diode may provide sufficient reset current for a significant volt-time blocking capability. In many other applications, however, the reverse recovery current will be insufficient, and an auxiliary reset circuit may be necessary to provide the required reset.

Figure 5:
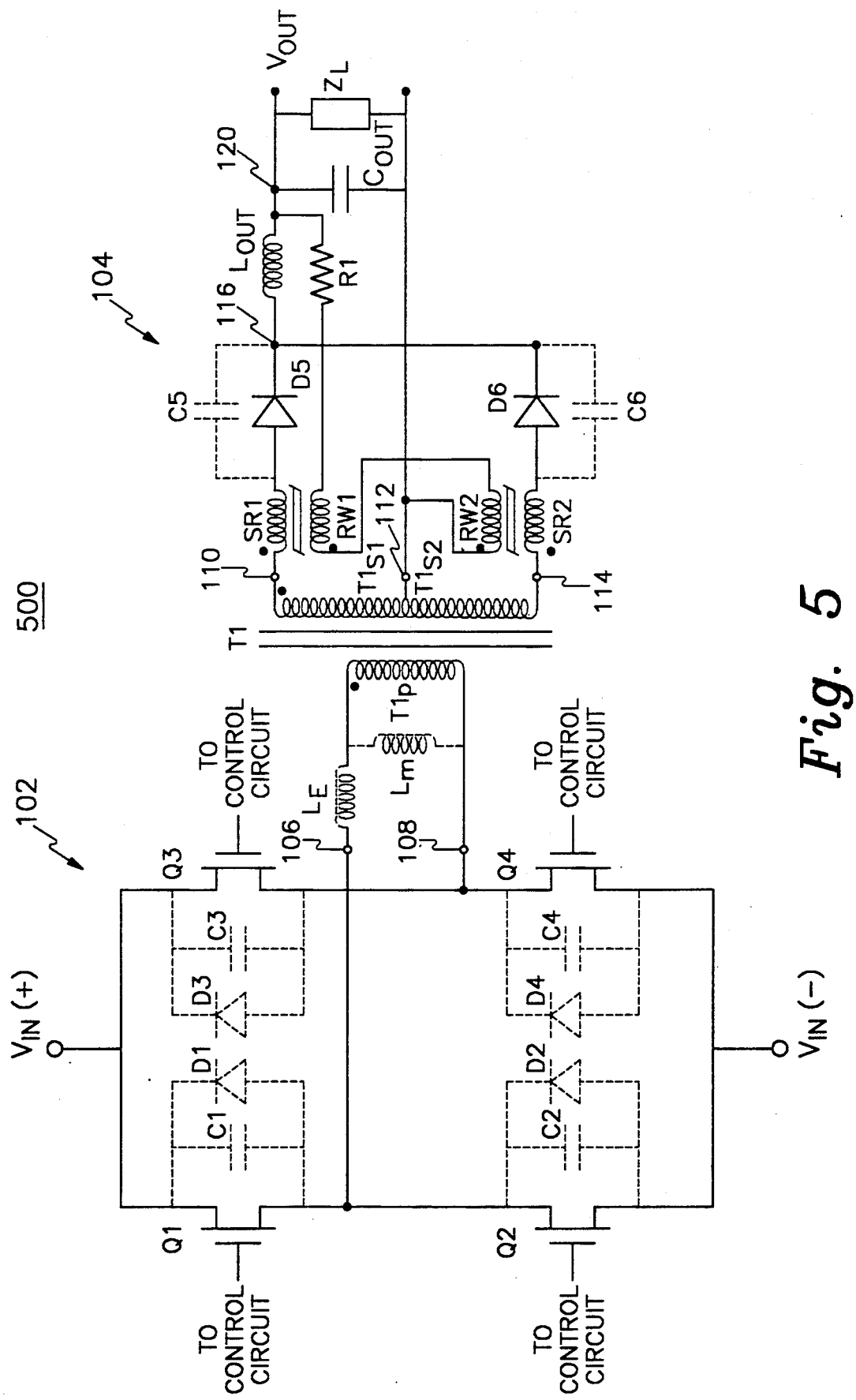
FIG. 5 is a schematic diagram of an alternate embodiment of the converter circuit of the present invention which includes a reactor reset circuit.

One method of providing the required reset current is shown in FIG. 5. A converter 500 is shown. Note that converter 500 is substantially identical to converter 100 except for the addition of a reactor reset circuit. The reactor reset circuit includes resistor R1, and reactor reset windings RW1 and RW2.

Figure 6:
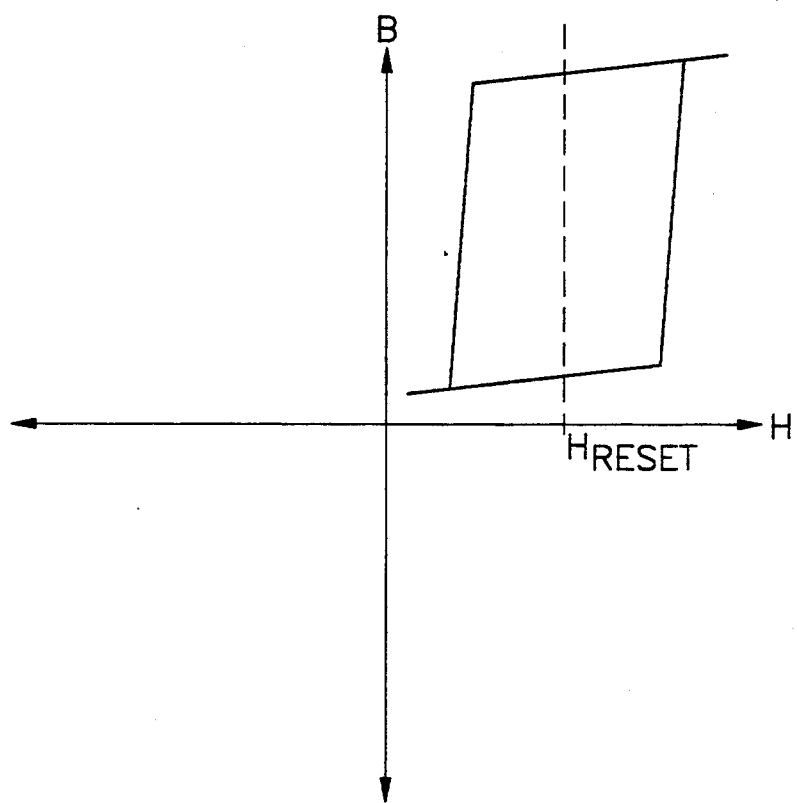
FIG. 6 shows a sample BH loop for a square loop magnetic material which has been "shifted" by a reset current.

Resistor R1 is connected in series with reset windings RW1 and RW2. The series combination of R1, RW1 and RW2 is connected in shunt fashion from the second terminal of $L_{OUT}$ to center-tapped terminal 112 of $T1_S$. A reset current passing through a reset winding (RW1 or RW2) will drive the corresponding core out of saturation and into the high impedance or blocking mode. Essentially, the reset current "shifts" the BH loop into the first quadrant of the hysteresis graph as shown in FIG. 6.

The amount of blocking provided by the square loop core saturable reactor depends on the amount of reset current provided to it during reset. In other words, the amount of volt-time applied to the saturable core through RW1 or RW2 during reset will enable the core to block diode conduction for the same amount of volt-time during the free-wheeling interval (and possibly into the subsequent on-time).

Due to the capability of blocking into the subsequent on-time, an additional advantage of square loop material is that significant blocking can also be provided at the turn-on transition. By increasing the reset volt-time, turn-on of the secondary circuit can be delayed until after transistor Q1 (for the first half-cycle) or transistor Q2 (for the second half-cycle) reaches zero volts. The primary current before turn-on will resemble a constant current which is available for charging C1-C4. The output inductor is the current source (similar to the behavior at the turn-off to freewheeling transition). Thus, sufficient energy is available for ZVS at the beginning of each half-cycle on-time to charge the FET capacitances (C1-C4) and achieve ZVS. This energy stored in the output inductor is much greater than the energy stored in the leakage inductance as discussed for the soft core material.

Figure 7:
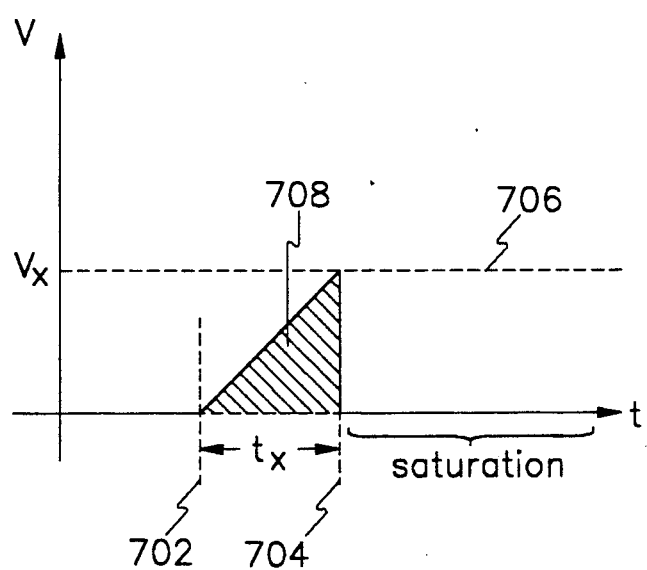
FIG. 7 is volt-time graph illustrating the volt-time blocking requirement for a saturable reactor.

The required blocking volt-time is illustrated with reference to FIGS. 2 and 7. For example, at $t_8$ in FIG. 2, Q2 turns off and capacitors C1 and C2 must be charged/discharged to increase the voltage at node 106 to Vin(+) before turning ON Q1. Line 702 in FIG. 7 corresponds to time $t_8$. Line 704 corresponds to the time when the drain-to-source voltage of Q1 is approximately zero. Given the minimum load current at which ZVS is desired, the primary current available, and the drain-to-source capacitances (i.e., C1-C4) of Q1-Q4, the blocking time $t_X$ required for node 106 to reach Vin(+) can be calculated.

The blocking voltage $V_X$ (required during $t_X$) follows the reflected primary voltage $V_{T1P}$. Thus, $V_X$ increases up linearly from zero at line 702 to a maximum, at line 704, of approximately twice Vin reflected into one-half of $T1_S$. The factor of two accounts for the fact that the voltage from both halves of the secondary must be blocked. The total volt-time required will be the hatched area 708. The reset volt-time must exceed this amount to meet ZVS blocking requirements.

The advantages in ZVS provided by the square loop material involve a trade-off in performance. The trade-off for improved ZVS is a slight increase in pulse-width for a given output voltage. In addition, the diode current during the blocking time is not really zero, since absolute blocking is not achieved. Due to the "shifting" of the BH loop, a current will pass through the blocking saturable reactor which is approximately twice the normal reset current for a given core design. Although this must be given consideration during design, it is usually a small current compared to the load current.

While the invention has been particularly shown and described with reference to preferred embodiments thereof, it will be understood by those skilled in the art that various changes in form and details may be made therein without departing from the spirit and scope of the invention.

Having thus described our invention, what we claim as new and desire to secure by Letters Patent is:

1. A full bridge, resonant transition, DC-to-DC, switching power converter circuit, adapted to be used with a DC power supply means, which circuit comprises:
   (a) a bridge circuit having a separate switch connected in each of the four legs thereof, and adapted so that said DC power supply means can be connected across a first diagonal of said bridge circuit;
   (b) a power transformer having a primary winding, a first secondary winding and a second secondary winding, said first and second secondary windings being connected in a center-tapped configuration, and said primary winding being connected across a second diagonal of said bridge circuit;
   (c) means for determining and controlling a conduction interval for each of said switches to produce a first half-cycle and a second half-cycle of converter operation, said first and second half-cycles each including an on-time and a free-wheeling interval,
   (d) a first saturable reactor, having a high impedance state and a saturated state, connected in series with said first secondary winding;
   (e) a first rectifier having an anode and a cathode, said anode being connected to said first saturable reactor;
   (f) a second saturable reactor, having a high impedance state and a saturated state, connected in series with said second secondary winding; and
   (g) a second rectifier having an anode and a cathode, said anode being connected to said second saturable reactor, and said cathode being connected to said cathode of said first rectifier,
   wherein said second saturable reactor is in said high impedance state for at least a portion of said first half-cycle free-wheeling interval, and said first saturable reactor is in said high impedance state for at least a portion of said second half-cycle free-wheeling interval.

2. The full bridge, resonant transition, DC-to-DC, switching power converter circuit set forth in claim 1, wherein each said switch is a field effect transistor.

3. The full bridge, resonant transition, DC-to-DC, switching power converter circuit set forth in claim 2, further comprising an inductor serially connected between said cathodes of said rectifiers and a converter output terminal.

4. The full bridge, resonant transition, DC-to-DC, switching power converter circuit set forth in claim 3, wherein said first and second saturable reactors comprise a core of soft magnetic material.

5. The full bridge, resonant transition, DC-to-DC, switching power converter circuit set forth in claim 3, wherein said first and second saturable reactors comprise a core of square BH loop magnetic material.

6. The full bridge, resonant transition, DC-to-DC, switching power converter circuit set forth in claim 5, further comprising a reactor reset circuit.

7. A full bridge, resonant transition, switching power converter circuit comprising:
   (a) a bridge switching circuit for producing a chopped voltage from a DC input voltage, said switching circuit having a first input terminal, a second input terminal, a first output terminal, and a second output terminal, said first and second input terminals being adapted for connection to a DC input voltage, said switching circuit including (i) a first FET (Q1) having a parasitic drain source capacitor C1, Q1 being connected between said first input terminal and said first output terminal, (ii) a second FET (Q2) having a parasitic drain source capacitor C2, Q2 being connected between said second input terminal and said first output terminal, (iii) a third FET (Q3) having a parasitic drain source capacitor C3, Q3 being connected between said first input terminal and said second output terminal, and (iv) a fourth FET (Q4) having a parasitic drain source capacitor C4, Q4 being connected between said second input terminal and said second output terminal;

(b) a power transformer having a primary winding, a first secondary winding, and a second secondary winding, said primary winding is connected across said first and second output terminals of said switching circuit, and said first and second secondary windings are connected in a center-tapped configuration;

(c) a first saturable reactor connected in series with said first secondary winding, said first saturable reactor having a high impedance state and a saturated state;

(d) a first rectifier having an anode and a cathode, said anode being connected to said first saturable reactor;

(e) a second saturable reactor connected in series with said second secondary winding, said second saturable reactor having a high impedance state and a saturated state;

(f) a second rectifier having an anode and a cathode, said anode being connected to said second saturable reactor, said cathode of said first rectifier being connected to said cathode of said second rectifier;

(g) a filter inductor connected between the junction of said cathodes of said rectifiers and an output terminal of the power converter circuit; and (h) means for determining and controlling a conduction interval for each of Q1–Q4 to produce a first half-cycle and a second half-cycle of converter operation, said first and second half-cycles each including an on-time and a free-wheeling interval, whereby during said first half-cycle freewheeling interval, said first saturable reactor is in said saturated state while said second saturable reactor is in said high impedance state, and during said second half-cycle freewheeling interval, said first saturable reactor is in said high impedance state while said second saturable reactor is in said saturated state, and whereby a current is induced to flow in $T1_P$ during each free-wheeling interval.

8. The full bridge, resonant transition, switching power converter circuit set forth in claim 7, wherein said first and second saturable reactors each comprise a core of soft magnetic material.

9. The full bridge, resonant transition, switching power converter circuit set forth in claim 7, wherein said first and second saturable reactors each comprise a core of square BH loop magnetic material.

10. The full bridge, resonant transition, switching power converter circuit set forth in claim 9, further comprising a reactor reset circuit.

11. A full bridge, resonant transition, DC-to-DC, switching power converter circuit comprising:

(a) a transformer having a primary winding, a first secondary winding and a second secondary winding;

(b) full bridge switching means for chopping a DC voltage, said switching means adapted to provide a chopped voltage to said primary winding of said transformer;

(c) means for controlling said switching means to produce a first half-cycle and a second half-cycle of converter operation, said first and second half-cycles each including an on-time and a free-wheeling interval, (d) first blocking means for providing a blocking impedance in series with said first secondary of said transformer for at least a portion of said second half-cycle free-wheeling interval; and (e) second blocking means for providing a blocking impedance in series with said second secondary of said transformer for at least a portion of said first half-cycle free-wheeling interval.

12. The full bridge, resonant transition, DC-to-DC, switching power converter circuit set forth in claim 11, wherein each said blocking means includes a saturable reactor.

13. The full bridge, resonant transition, DC-to-DC, switching power converter circuit set forth in claim 12, wherein said saturable reactors comprise a core of soft magnetic material.

14. The full bridge, resonant transition, DC-to-DC, switching power converter circuit set forth in claim 12, wherein said saturable reactors comprise a core of square BH loop magnetic material.

15. The full bridge, resonant transition, DC-to-DC, switching power converter circuit set forth in claim 14, further comprising a reactor reset circuit.

16. In a full bridge, resonant transition, DC-to-DC, switching power converter circuit including:

a bridge switching circuit for producing a chopped voltage from a DC input, said switching circuit having first and second input terminals adapted for connection to a DC input voltage and first and second output terminals, said switching circuit including a first FET (Q1) having a parasitic drain source capacitor C1, Q1 being connected between said first input terminal and said first output terminal, a second FET (Q2) having a parasitic drain source capacitor C2, Q2 being connected between said second input terminal and said first output terminal, a third FET (Q3) having a parasitic drain source capacitor C3, Q3 being connected between said first input terminal and said second output terminal, and a fourth FET (Q4) having a parasitic drain source capacitor C4, Q4 being connected between said second input terminal and said second output terminal;

a power transformer having a primary winding, a first secondary winding, and a second secondary winding, said primary winding is connected across said first and second output terminals of said switching circuit, and said first and second secondary windings are connected in a center-tapped configuration;

a first saturable reactor connected in series with said first secondary winding, said first saturable reactor having a high impedance state and a saturated state;

a first rectifier having an anode and a cathode, said anode being connected to said first saturable reactor;

a second saturable reactor connected in series with said second secondary winding, said second saturable reactor having a high impedance state and a saturated state;

a second rectifier having an anode and a cathode, said anode being connected to said second saturable reactor, said cathode of said first rectifier being connected to said cathode of said second rectifier;

a filter inductor connected between the junction of said cathodes of said rectifiers and an output terminal of the power converter circuit; and means for determining a conduction interval for and for controlling each of Q1-Q4 to produce a first half-cycle and a second half-cycle of converter operation, said first and second half-cycles each including an on-time and a free-wheeling interval, a method for reducing switching power losses, said method including the steps of:

(a) switching Q1 ON at a time $t_1$ to commence said first half-cycle on-time, Q4 is ON from a previous cycle of operation and Q2 and Q3 are OFF (b) switching Q4 OFF at a time $t_2$ to commence said first half-cycle free-wheeling interval;

(c) maintaining SR2 in said high impedance state for at least a portion of said first half-cycle free-wheeling interval;

(d) switching Q3 ON at a time $t_3$ when the voltage across C3 reaches a desired level;

(e) switching Q1 OFF at a time $t_4$;

(f) switching Q2 ON at a time $t_5$ when the voltage across C2 reaches a desired level to commence said second half-cycle on-time;

(g) switching Q3 OFF at a time $t_6$ to commence said second half-cycle free-wheeling interval;

(h) maintaining SR1 in said high impedance state for at least a portion of said second half-cycle free-wheeling interval;

(i) switching Q4 ON at a time $t_7$ when the voltage across C4 reaches a desired level;

(j) switching Q2 OFF at a time $t_8$; and (k) switching Q1 ON at a time $t_9$ when the voltage across C1 reaches a desired level to recommence said first half-cycle on-time and to commence a next cycle of converter operation.

* * * * *